United States Patent
Müller et al.

(10) Patent No.: US 12,182,973 B2
(45) Date of Patent: Dec. 31, 2024

(54) CAMERA AND METHOD FOR ACQUIRING IMAGE DATA

(71) Applicant: SICK AG, Waldkirch (DE)

(72) Inventors: Romain Müller, Waldkirch (DE); Hannes Ruf, Waldkirch (DE)

(73) Assignee: SICK AG, Waldkirch (DE)

( * ) Notice: Subject to any disclaimer, the term of this patent is extended or adjusted under 35 U.S.C. 154(b) by 496 days.

(21) Appl. No.: 17/724,690

(22) Filed: Apr. 20, 2022

(65) Prior Publication Data
US 2022/0358625 A1 Nov. 10, 2022

(30) Foreign Application Priority Data
May 5, 2021 (DE) .......................... 102021111639.2

(51) Int. Cl.
*G06T 5/70* (2024.01)
*G06V 10/30* (2022.01)
*G06V 10/75* (2022.01)

(52) U.S. Cl.
CPC ................ *G06T 5/70* (2024.01); *G06V 10/30* (2022.01); *G06V 10/758* (2022.01)

(58) Field of Classification Search
None
See application file for complete search history.

(56) References Cited

U.S. PATENT DOCUMENTS

| 8,614,746 B2 | 12/2013 | Choe et al. |
| 2008/0284880 A1 | 11/2008 | Numata |
| 2009/0316172 A1* | 12/2009 | Tanimoto ............. H04N 1/0449 358/1.9 |

(Continued)

FOREIGN PATENT DOCUMENTS

| DE | 602 00 579 T2 | 6/2005 |
| DE | 202019106363 U1 | 3/2021 |

(Continued)

OTHER PUBLICATIONS

German Office Action dated Dec. 22, 2021 corresponding to application No. 102021111639.2.

(Continued)

*Primary Examiner* — Samah A Beg
(74) *Attorney, Agent, or Firm* — Nath, Goldberg & Meyer; Jerald L. Meyer

(57) ABSTRACT

A camera includes an image sensor having a first recording channel of a first sensitivity for recording first image data including first pixels and a second recording channel of a second sensitivity lower than the first sensitivity for recording second image data including second pixels. The first pixels and second pixels are associated with one another by capturing a same object area. A control and evaluation unit processing the image data is configured to suppress noise effects in the second image data using a noise suppression filter that assigns a new value to a respective considered second pixel based on second pixels in a neighborhood of the considered second pixel. The noise suppression filter takes the second pixels in the neighborhood into account with a weighting that depends on how similar first pixels associated with the second pixels are to the associated first pixel of the respective considered second pixel.

19 Claims, 4 Drawing Sheets

(56) References Cited

U.S. PATENT DOCUMENTS

Figure 1:
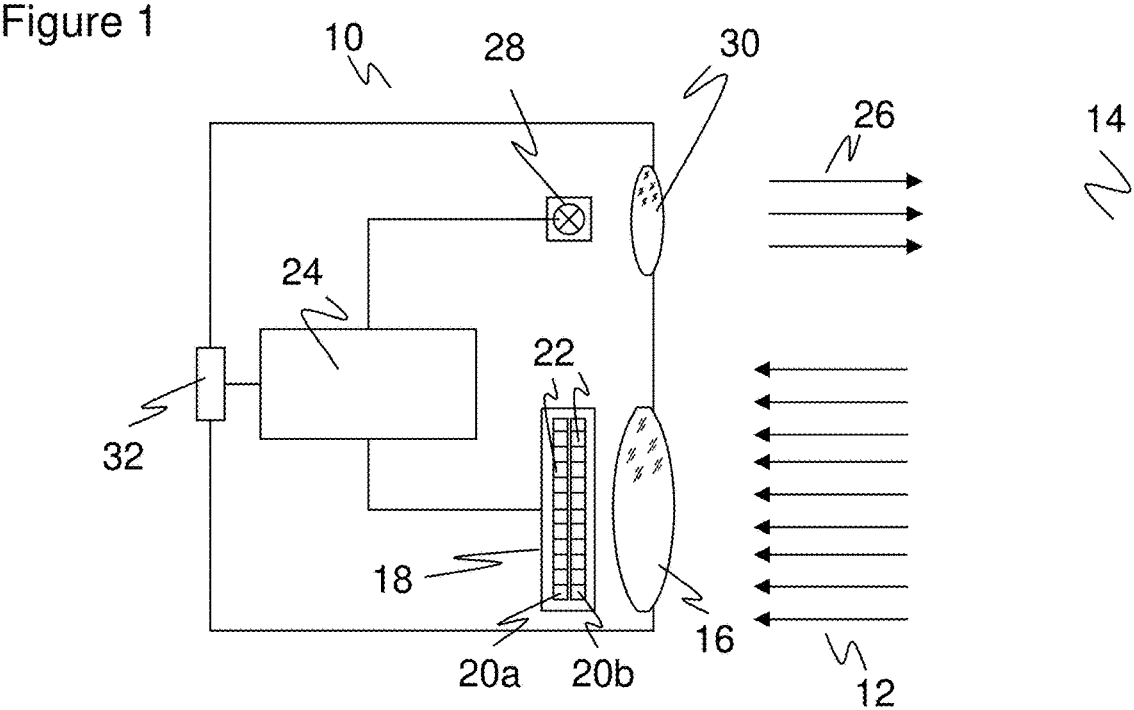

| | | | |
|---|---|---|---|
| 2010/0085433 A1* | 4/2010 | Choe | H04N 23/84 |
| | | | 348/E5.09 |
| 2010/0316291 A1* | 12/2010 | Deng | G06K 7/14 |
| | | | 382/313 |
| 2012/0002066 A1 | 1/2012 | Wang | |

FOREIGN PATENT DOCUMENTS

| | | |
|---|---|---|
| EP | 1291821 A1 | 3/2003 |
| JP | 2002-259962 A | 9/2002 |
| JP | 201004533 A | 1/2010 |

OTHER PUBLICATIONS

Harashima, et al., "e-Separating Nonlinear Digital Filter and Its Applications", Electronics and Communications in Japan, vol. 65, Issue No. 4, pp. 11-19, 1982.

* cited by examiner

CAMERA AND METHOD FOR ACQUIRING IMAGE DATA

The invention relates to a camera and a method for acquiring image data.

Image data from a camera are used in many industrial and logistical applications. Various processes can be automated. In addition to measuring, manipulation and inspection tasks, the automatic sorting of objects based on codes read with the aid of the image data is known. For this purpose, barcodes and various two-dimensional codes are read, such as a Maxicode or an Aztec code, and also labels that are decoded using text recognition (OCR).

In a typical application situation, such as at a production line, baggage handling in airports or automated sorting of packages in logistics centers, the objects are conveyed past the camera, and image data of the objects are recorded. In this relative movement between the objects and the camera, line scan cameras are particularly suitable because they achieve a very high resolution and speed. The successively captured individual image lines are assembled on the basis of the known or measured belt speed. This is particularly advantageous for fast belt applications, since a high frame rate is required and a simple stitching of image lines is possible without any major computing effort, in contrast to the stitching of individual images from a matrix camera.

Conventional line scan cameras usually capture only a monochrome image, also known as a grayscale image or black and white image. This achieves the best photon yield and therefore the best signal-to-noise ratio. For capturing color images, matrix cameras are more commonly used. The most common color generation uses two green, one red and one blue filter pixel by pixel in a Bayer pattern. However, there are also alternative color patterns that, for example, add a white channel (RGBW) or use subtractive primary colors, such as red, yellow and blue (RYB).

Color line scan cameras are also known. They have, for example, three lines in red, green and blue (RGB), an alternating arrangement of these primary colors on a single line or, in imitation of the Bayer pattern, one line with alternating red and blue pixels and a second purely green line. The disadvantage of all these color image sensors is that received light is lost through the color filters and therefore a black and white image remains superior for applications such as code reading with higher resolution requirements. The color information can therefore only be gained at the price of poorer performance in terms of black and white evaluation.

A decisive parameter for the quality of image data and visualization for a user is the signal-to-noise ratio (SNR). A color image affects the signal-to-noise ratio because the color filters reduce the number of detectable photons. In principle, a decreasing signal-to-noise ratio can be counteracted by increasing the illumination, lengthening the exposure time or increasing the aperture, or using a more sensitive image sensor. However, such measures are optimized anyway, and illumination, for example, encounters a hard limit because of eye safety. Hence, this does not solve the specific disadvantage of a color image compared to a black and white image. Another possibility is image post-processing, for example using noise filters or neural networks. However, this is also frequently used anyway and therefore does not reduce the gap between the quality of monochrome and color image data. In addition, conventional noise filters also blur edges and other desired structures of color images.

DE 20 2019 106 363 U1 discloses a code reader for reading optical codes that uses at least one double line as an image sensor, with receiving pixels of at least one line being sensitive to white light and receiving pixels of the remaining line being sensitive to only one color. This allows a gray scale image and a color image to be captured. In some embodiments, one primary color is reconstructed from the grayscale image and two other primary colors. However, the document does not address the problem of the poorer signal-to-noise ratio of the color image.

From US 2010/0316291 A1 and US 2012/0002066A1, respectively, a code-reading device is known that captures images with a pixel matrix. Most pixels are monochrome, color pixels are interspersed in a grid arrangement. These color pixels form a Bayer pattern. US 2012/0002066A1 also discusses filters for image post-processing, but these do not take into account the difference in color images and black and white images, so that there still is a significantly worse signal-to-noise ratio of the color images.

It is therefore an object of the invention to improve an image recording with recording channels of different quality, in particular of black and white image data and color image data.

This object is satisfied by a camera, in particular a code reader for reading an optical code, comprising an image sensor having a first recording channel of a first sensitivity for recording first image data including first pixels and a second recording channel of a second sensitivity lower than the first sensitivity for recording second image data including second pixels, wherein first pixels and second pixels are associated with one another by capturing a same object area, and a control and evaluation unit for processing the image data, configured to suppress noise effects in the second image data using a noise suppression filter that assigns a new value to a respective considered second pixel based on second pixels in a neighborhood of the considered second pixel, wherein the noise suppression filter takes the second pixels in the neighborhood into account with a weighting that depends on how similar first pixels associated with the second pixels are to the associated first pixel of the respective considered second pixel.

The object is also satisfied by a method for acquiring first image data including first pixels in a first recording channel of a first sensitivity of an image sensor and for acquiring second image data including second pixels in a second recording channel of a second sensitivity smaller than the first sensitivity of the image sensor, wherein first pixels and second pixels are associated with one another by capturing a same object area, wherein noise effects in the second image data are suppressed using a noise suppression filter that assigns a new value to a respective considered second pixel based on second pixels in a neighborhood of the considered second pixel, wherein the noise suppression filter takes the second pixels in the neighborhood into account with a weighting that depends on how similar first pixels associated with the second pixels are to the associated first pixel of the respective considered second pixel.

An image sensor of the camera records first image data including first pixels and second image data including second pixels with two recording channels of different sensitivity. The image data are overlapping, thus corresponding at least partially and preferably completely to the same object area. First pixels and second pixels are associated with on another in that their field of view corresponds to an equal section of the field of view of the camera. First and second pixels associated with one another thus record the same object structures. The two recording channels and consequently the mutually associated first and second pixels differ from each other in one modality, in particular spectrally. The different sensitivity of the two recording channels and the resulting different signal-to-noise ratio of the first and second image data is a consequence that has to be accepted rather than a desired effect. The reasons for the different sensitivity are not relevant for the invention, it is just a given fact. Throughout this specification, the terms preferably or preferred refer to advantageous, but completely optional features.

A control and evaluation unit processes the image data using an image processing method. Preferably, the camera is configured as a code reader for reading an optical code, and its control and evaluation unit is configured to find a code to be read in the image data and to read out the code content encoded therein. As a preprocessing step, noise effects of the second image data are suppressed with a noise suppression filter.

For this purpose, the second pixels are preferably processed individually, either sequentially or at least partially simultaneously in a parallelized architecture. The respective considered second pixel gets a new, adjusted value based on its neighborhood of second pixels, preferably taking into account its original value. Then, the filtering is iterated, another second pixel becomes the considered second pixel, as usual in image processing by means of filters, until all second pixels or the desired subset or image section is processed.

The invention starts from the basic idea of tying the noise suppression of the second image data to a similarity in the first image data. The neighborhood of second pixels of the respective considered second pixel is reweighted accordingly. For this purpose, the first pixel associated with the considered second pixel and that first pixel's neighborhood are used. In terms of the object domain, this is the same image section of the first image data that the noise suppression filter takes into account in the second image data. It is checked which neighboring first pixels in the first image data are similar to the first pixel that is associated with the considered second pixel. Those second pixels that are associated with similar first pixels are more strongly taken into account for the new value of the respective considered second pixel during processing with the noise suppression filter. Accordingly, in the noise suppression filter, second pixels in the neighborhood of the considered second pixel contribute less whose associated first pixels are not similar or less similar to the first pixel associated with the considered second pixel. The idea behind this is to find those second pixels of the neighborhood in the less sensitive second recording channel which belong to the same object structure as the considered second pixel via the similarity in the more precise, because more sensitive, first recording channel.

The invention has the advantage that the higher sensitivity and better signal-to-noise ratio of the first recording channel is in a certain way transferred to the second recording channel. Noise is suppressed or reduced in the second image data, and the second image data thus gain in quality and signal-to-noise ratio, with little or no loss of spatial resolution. In contrast, a conventional noise suppression filter operating only within the second image data would inevitably blur edges. The process according to the invention remains simple and can also be performed in real time with manageable computing and storage capacities.

The control and evaluation unit preferably is configured to take into account, for the noise suppression filter, only second pixels in the neighborhood whose associated first pixel fulfills a similarity criterion to the first pixel associated with the respective considered second pixel. This is kind of a digitization or binarization of similarity: Second pixels whose associated first pixels do not satisfy the similarity criterion are not considered at all. Those second pixels whose associated first pixels satisfy the similarity criterion are preferably weighted equally among themselves. Alternatively to a digital similarity criterion, a weighting can be chosen that depends on the similarity. For the weights of the second pixels from the neighborhood of the considered second pixel, a weighting function can then be defined whose argument is the difference of the associated first pixel to the first pixel associated to the considered second pixel. In all cases, an additional position-dependent weight can be superimposed, for example a weight decreasing with the distance to the considered second pixel.

The similarity criterion preferably comprises at least one threshold for evaluating a difference between a first pixel in the neighborhood and the associated first pixel of the respective considered second pixel. The threshold can be set symmetrically to the value of the first pixel that is associated with the respective considered second pixel. Alternatively, different thresholds upwards and downwards are conceivable. First pixels in the neighborhood within the corridor formed by the threshold(s) satisfy the similarity criterion, while first pixels in the neighborhood outside the corridor do not.

The noise suppression filter preferably is an averaging filter. This means that smoothing or averaging is performed over the neighborhood of the considered second pixel. However, according to the invention, the second pixels of the neighborhood contribute in dependence of the similarity of the associated first pixel to that first pixel which is associated to the considered second pixel. The weighting may be binary as explained, i.e. second pixels contribute if there is sufficient similarity in the associated first pixels and do not contribute otherwise, or it may be set as a function of similarity. Again, in both cases an additional weight can be added, for example a weight decreasing with the distance to the considered second pixel.

The noise suppression filter preferably comprises a filter kernel defining a neighborhood around a respective considered pixel. The filter kernel's values are preferably set according to a similarity of first pixels in a neighborhood to a central first pixel. Convolution with a filter kernel n itself is a common method. According to this embodiment, the filter kernel is defined per considered second pixel. The filter kernel depends on the neighborhood of that specific first pixel that is associated with the respective considered second pixel. Accordingly, it is a locally, not globally defined filter kernel, although of course the rules for generating the filter kernel are preferably global. The individual values or weights of the filter kernel determine the proportion of a second pixel from the neighborhood to be included in the new pixel value of the respective considered second pixel. These weights are set on the basis of the similarity in the associated pixels of the first image data.

A filter kernel preferably is defined as a matrix having n pixels in all directions around the considered second pixel. The considered second pixel can therefore be called the central second pixel of the respective filter step. The matrix thus centered is placed on the neighborhood of the second pixels and the convolution is calculated, in particular as a sum over the pointwise product of the filter kernel and the second pixels of the neighborhood. The considered second pixel is only preferably located in the center. A decentralized arrangement can also be achieved by zeros in the filter kernel. For the same reasons, a matrix is also not a practical limitation, but only a simple implementation for arbitrary neighborhoods or vicinities, since zeros can be set at the edges for any geometric shape.

The control and evaluation unit preferably is configured to allocate zero values to the filter kernel where a similarity criterion is not fulfilled and/or to allocate non-zero values of mutually equal size where a similarity criterion is fulfilled. This is a digital or binary embodiment of the filter kernel as explained, which considers only second pixels whose associated first pixels are sufficiently similar to the first pixel associated with the considered second pixel. Illustratively, the filter kernel is arranged around the considered second pixel, and a corresponding section is placed around the associated first pixel in the first image data. Now, where the first pixels are not sufficiently similar to the central first pixel, zeros are set in the filter kernel to disregard this part of the neighborhood in the noise suppression filter. In the remaining parts of the filter kernel, the neighborhood of the second pixels should be taken into account, and preferably with equal weight. Alternatively to binary entries of the filter kernel, entries can be set according to a weighting function depending on the similarity, as described above. Again, it is conceivable to further modulate the weights, for example to decrease them with increasing distance to the considered second pixel.

The control and evaluation unit preferably is configured to count a number how often the filter kernel has non-zero values and in particular to normalize the filter kernel with the number. The filter kernel has m non-zero entries for which the similarity criterion is fulfilled. This number m is determined in order to refer to the correct number of contributing values in an averaging or other calculation. Provided that the non-zero entries in the filter kernel are equal to each other and in particular set to one, m is equal to the sum, possibly up to a scaling factor. The filter kernel can be normalized by dividing all entries by m.

The control and evaluation unit preferably is configured to adapt the resolution of the first image data and the second image data to one another. Depending on the image sensor, the first image data and the second image data may originally have different resolutions. This can be compensated for, for example by interpolating the lower-resolution image data or by pixel binning or downsampling of the higher-resolution image data. In the overlap area of the first image data and the second image data, exactly one second pixel is then associated with each first pixel. To repeat, the overlap area corresponds to a jointly detected object area of the two recording channels, and the overlap preferably is complete. Then, the 1:1 relationship between first and second pixels applies everywhere.

Without a resolution adjustment, there may be multiple associations. The conditional noise suppression according to the invention will still work, but will have to consider additional special and edge cases in the implementation.

The first recording channel preferably is configured as a monochannel with sensitivity to white light for recording image data of a gray-scale image, also referred to as a black and white image or monochrome image. The first recording channel thus has light-receiving pixels that are sensitive to white light, which is intended to mean that they detect the entire optical spectrum and for example have no color filters. The limit of the received light is of course given by the unavoidable hardware limitations of the camera pixels.

The second recording channel preferably is configured as at least one color channel having sensitivity to light of a particular color for recording image data of the color. The second recording channel thus has light-receiving pixels that are sensitive only to light in the color of the color channel, for example by means of corresponding color filters.

The distribution of the light receiving pixels of a color channel may form different patterns, this differs depending on the embodiment.

The second recording channel preferably comprises a plurality of color channels of different colors. This means that the second image data is generated multiple times, preferably in the primary colors RGB (red, green, blue) or CMY (cyan, magenta, yellow). Respective single-color images, for example a red, green and blue image, can be filtered in themselves or together using the invention. Preferably, the second recording channel has only two color channels for two of the three primary colors. Thus, there are no color channels and no light-receiving pixels sensitive to the third primary color. The control and evaluation unit preferably is configured to reconstruct the third primary color from the two primary colors using the first image data, i.e. white image data. White is a super-position of all the primary colors, so that the third primary color can be isolated when the other two primary colors are recorded. The two primary colors are preferably red and blue. In general, additive primary colors lead to better results. Green, which is duplicated in the Bayer pattern, is not recorded in this preferred embodiment, so no light-receiving pixels or color channel need be provided for green. If required, green is generated from the white, red and blue image information. Illustratively, green is thus reconstructed from $G=3*\alpha W-\beta R-\gamma B$, where $\alpha$, $\beta$, $\gamma$ are normalization factors and preferably an additional color correction is applied.

The image sensor preferably is configured as a line sensor having at least two lines of light-receiving elements, wherein in particular each line is completely assigned to either the first recording channel or the second recording channel. The camera thus is a line scan camera. The recording channels are preferably made up of entire lines, for example the first line forms the first recording channel and the second line forms the second recording channel. This results in the highest possible resolution in the line direction. In color channels in particular, there can also be patterns as an alternative to a continuous single-color line, for example alternating light-receiving pixels for different colors. As another alternative, uniformly colored lines and mixed-color lines can be combined. In principle, light-receiving elements sensitive to white can also be interspersed in a line of a color channel, but a different line of the monochannel is already responsible for such image information.

Preferably two, three or four lines are provided. The numbers given here are exact specifications, not minimum specifications. With few lines, a particularly compact structure of the image sensor is achieved. Two lines result in a double line, one or two additional lines provide a certain redundancy, in particular for color patterns. Again, each line in its entirety preferably is part of a specific recording channel.

The camera preferably is stationarily mounted above a stream of objects to be recorded. In this way, image lines are preferably recorded one after the other and stitched together to form an image. In the case of bar codes, code reading from a single line-shaped image is conceivable as an alternative, but bar codes are also preferably read from a two-dimensional overall image that has been stitched from a plurality of image lines. In particular, by using a time delay in reading out the image information of the various lines the image information can be superimposed so that the first and second image data correspond to the same sections of the objects.

The control and evaluation unit preferably is configured to generate a gray-scale image from the first recording channel and a color image from the second recording channel. The gray-scale image or black and white image is acquired in full resolution with high contrasts and the best possible signal-to-noise ratio. At the same time, a color image is obtained which can be used for various additional or alternative evaluations. The additional color acquisition is not at the expense of the resolution or the signal-to-noise ratio in the gray-scale image. On the contrary, thanks to the noise suppression filter according to the invention, the quality of the gray-scale image can be at least partially transferred to the color image.

The gray-scale image preferably is used for reading codes, i.e. the code content encoded in the code is read out. Code reading is possible with the same quality as with a conventional monochrome camera, in particular a line scan camera. The additional color information does not affect the decoding result. The gray-scale image can be used addition-ally or alternatively for other purposes than code reading.

A color image is an image within the usual meaning of the term, with colors recognizable to the human eye as usual, for example in RGB, and to be distinguished from a single-color image that contains, for example, only the red color information. Preferably, the color image is used in connection with code reading and to support it, in order to recognize, classify and/or distinguish code-bearing objects and/or code areas from the image background. Often, the code background is different in color from the surrounding area, or the color information can be used to detect and separate a code-bearing object from the background. Alternatively, the color image is used for some other function, in particular be output as such and only used downstream, be it for visualization and diagnostic functions or completely different additional tasks. The color image may have a lower resolution than the gray image, which can then be adjusted by upsampling/interpolation or downsampling/binning as mentioned above.

The method according to the invention can be modified in a similar manner and shows similar advantages. Further advantageous features are described in an exemplary, but non-limiting manner in the dependent claims following the independent claims.

Figure 2:
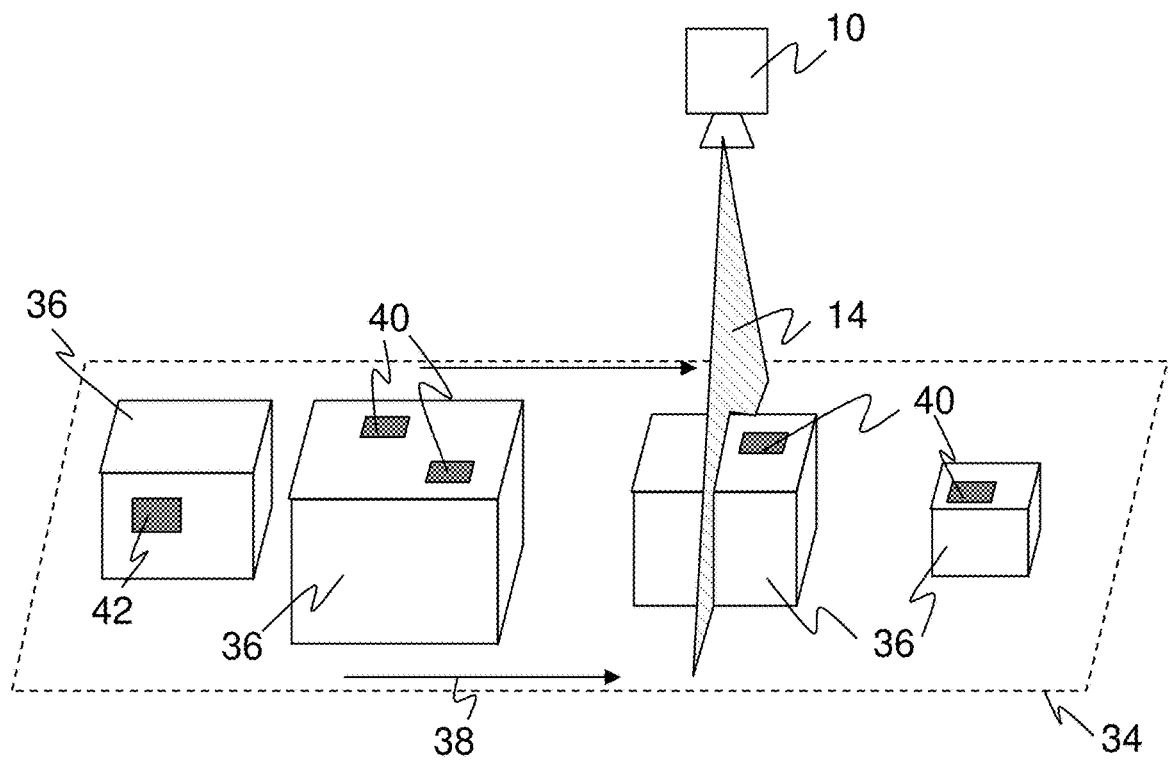
Figure 3:
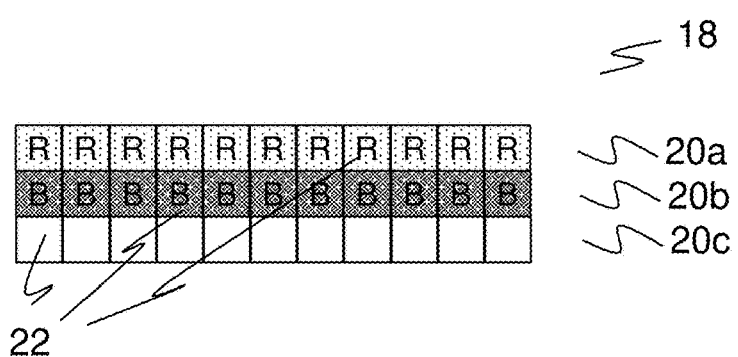
Figure 4:
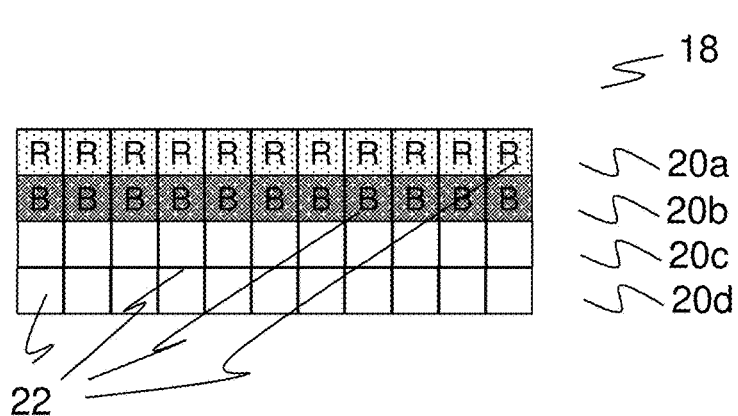
Figure 5:
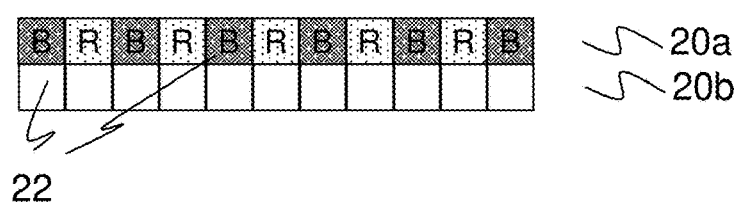
Figure 6:
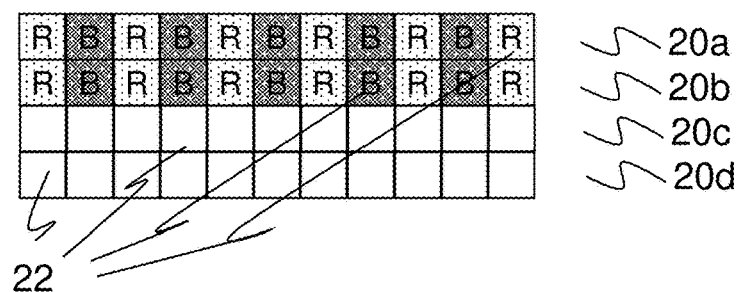
Figure 7:
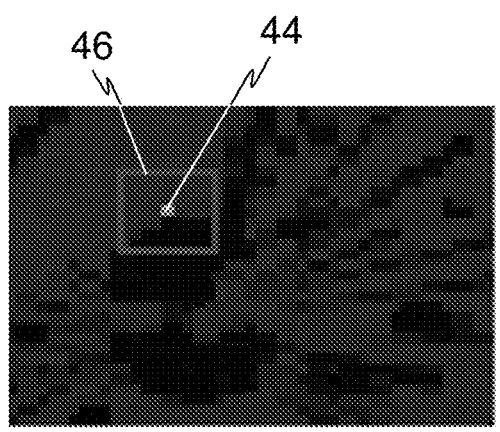
Figure 8:
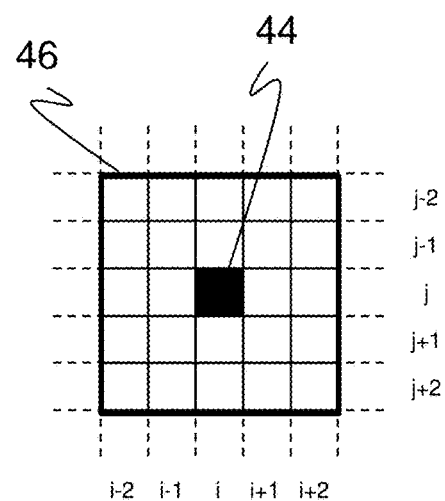
Figure 9:
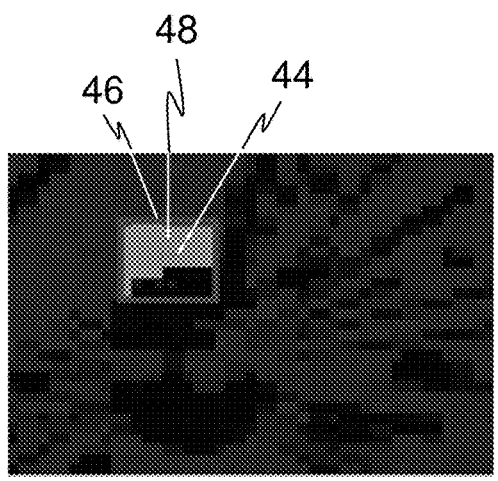
Figure 10:
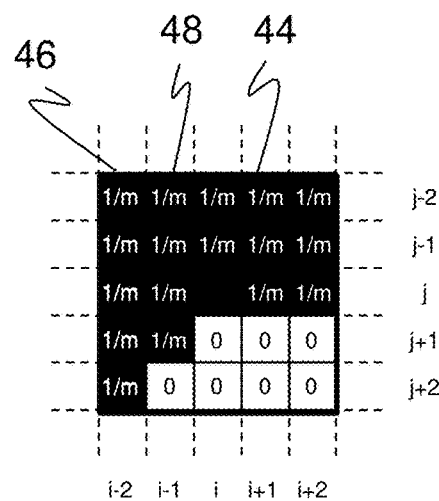
Figure 11:
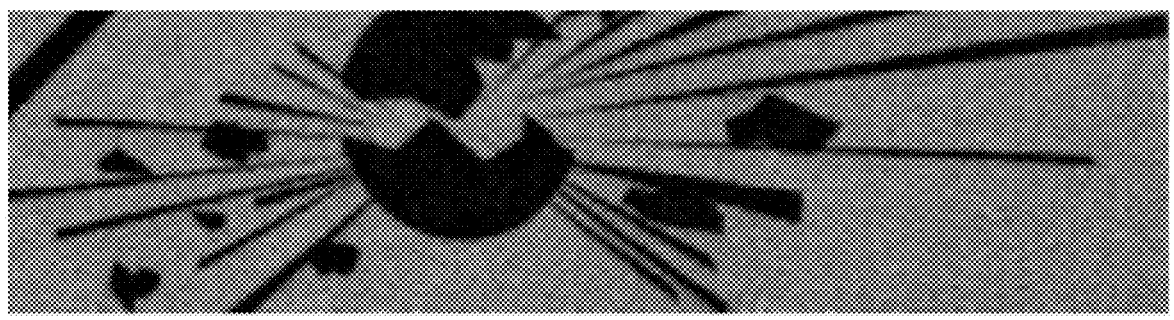

The invention will be explained in the following also with respect to further advantages and features with reference to exemplary embodiments and the enclosed drawing. The Figures of the drawing show in:

FIG. 1 a schematic sectional view of a line camera;

FIG. 2 a three-dimensional view of an application of the line camera in stationary mounting above a conveyor belt with objects, in particular for code reading;

FIG. 3 a schematic representation of a line image sensor having one red, one blue and one white line;

FIG. 4 a schematic representation of a line image sensor having one red, one blue and two white lines;

FIG. 5 a schematic representation of a line image sensor having an alternating red-blue and a white line;

FIG. 6 a schematic representation of a line image sensor having two alternating red-blue and two white lines;

FIG. 7 an example image with a pixel assigned a new value for noise suppression and a neighborhood contributing to the new value;

FIG. 8 a representation of the neighborhood according to FIG. 7 in a pixel grid;

FIG. 9 an example image according to FIG. 7, where the neighborhood contributing to the new value is masked by a similarity criterion in another recording channel;

FIG. 10 an illustration of a filter kernel corresponding to the masked neighborhood of FIG. 9;

FIG. 11 an example image before noise suppression; and

Figure 12:
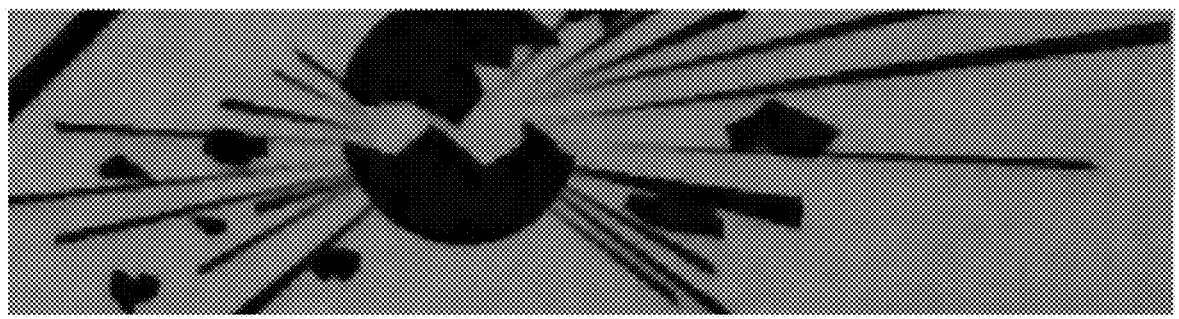

FIG. 12 the example image according to FIG. 11 after noise suppression according to the invention.

FIG. 1 shows a very simplified block diagram of a camera 10 in an embodiment as a line camera. The camera 10 detects received light 12 from a detection area 14 through a recording objective 16, represented by a simple lens. A line image sensor 18 generates image data of the detection area 14 and any objects and code areas present therein. The image sensor 18 has at least two lines 20*a-b* of light-sensitive receiving pixels 22, with a plurality of hundreds, thousands, or even more receiving pixels 22 being provided in the line direction.

The image data of the image sensor 18 are read out by a control and evaluation unit 24. The control and evaluation unit 24 is implemented on one or more digital components, for example microprocessors, ASICs, FPGAs or the like, which may also be provided in whole or in part outside the camera 10. A preferred part of the evaluation is stitching the recorded image lines to form an overall image. Otherwise, the image data can be filtered, smoothed, cropped to specific areas or binarized in preparation of or during the evaluation. Noise suppression will be explained in more detail later with reference to FIGS. 7 to 12. In a preferred embodiment of the camera 10 as a code reader, a segmentation is typically performed in which individual objects and code areas are located. The codes in these code areas are then decoded, i.e. the information contained in the codes is read out.

In order to sufficiently brightly illuminate the detection area 14 with transmission light 26, an illumination device 28 with transmission optics 30 may be provided, which, in deviation from the illustration, may also be external. Data can be output at an interface 32 of the camera 10, which may be read code information as well as other data in various processing stages, such as raw image data, preprocessed image data, identified objects or code image data not yet decoded. Conversely, it is possible to parameterize the camera 10 via the interface 32 or another interface.

FIG. 2 shows a possible application of the camera 10 mounted at a conveyor belt 34 that conveys objects 36 in a conveying direction 38, as indicated by the arrow, through the detection area 14 of the camera 10. The objects 36 may bear code areas 40 on their outer surfaces. The task of the camera 10 is to detect the code areas 40, to read out the codes attached there, to decode them and to assign them to the respective associated object 36. In order to also detect code areas 42 attached to the side, a plurality of cameras are preferably used from different perspectives. There may be additional sensors, for example an upstream laser scanner for detecting the geometry of the objects 36 or an incremental encoder for detecting the speed of the conveyor belt 34.

Corresponding to the line image sensor 18, the detection area 14 of the camera 10 is a plane with a line-shaped reading field. By recording the objects 36 line by line in the conveying direction 38, an overall image of the conveyed objects 36, together with the code areas 40, is created step by step. The lines 20*a-b* are so close together that they record practically the same object section. Alternatively, any offset may be compensated for mathematically or by reading out the lines with a small time offset.

The camera 10 uses an image sensor 18 to capture a gray-scale or black and white image that is used for code reading. In addition, color information or a color image is also obtained. The color information can be used for a variety of additional functions. One example is the classification of objects 36, for example to find out whether it is a package, an envelope or a bag. It can be determined whether a conveyor container is empty, such as a tray of a tray conveyor or a box. Segmentation of the image data into objects 36 or code regions 40 may be performed based on, or assisted by, the color information. Additional image recognition tasks can be solved, such as the recognition of certain imprints or stickers, for example for hazardous goods labeling, or text can be read (OCR, Optical Character Recognition).

FIGS. 3 to 6 show some examples of embodiments of the image sensor 18 for recording black and white images and color information. Common to these embodiments is that at least one of the lines 20*a*-*d* is a monochrome or white line whose receiving pixels 22 detect light across the spectrum within the limits of the hardware. At least one other line 20*a*-*d* is a color line whose receiving pixels 22 are sensitive only to a particular color, in particular by using appropriate color filters. The distribution of colors over the respective receiving pixels 22 of the colored lines differs according to the embodiment. The provision of at least one complete white line is preferred, because a gray-scale image is thereby recorded in full resolution. Likewise, a separation into white and colored lines is clearer. In principle, however, other patterns with white and colored receiving pixels 22 mixed within the lines 20*a*-*d* are conceivable. The respective receiving pixels 22 of the same spectral sensitivity are combined in a monochannel for the gray-scale image or in a color channel for a single-color image, for example for red-sensitive receiving pixels 22 in a red color channel for a red image and for blue-sensitive receiving pixels 22 in a blue color channel for a blue image.

FIG. 3 shows an embodiment with one red line 20*a*, one blue line 20*b* and one white line 20*c* each. The lines 20*a*-*c*-are thus homogeneous, and the receiving pixels 22 within a line 20*a*-*c* are sensitive to the same optical spectrum. FIG. 4 shows a variant with an additional white line 20*d*.

In the embodiment shown in FIG. 5, receiving pixels 22 sensitive to red and blue are alternately mixed within a colored line 20*a*. Thus, in combination with a white line 20*b*, a setup with a total of only two lines is possible. FIG. 6 shows a variant in which both the colored line 20*a*-*b* and the white line 20*c*-*d* are duplicated.

In the embodiments according to FIGS. 5 and 6, the resolution in the individual color channels differs from that of the monochannel. Resolution adjustment by interpolation or binning or the like is conceivable. The examples shown are only a selection based on the primary colors red and blue with white (RBW). Further embodiments use other color filters and colors. Thus, the use of green with red or blue (RGW, BGW) or all three primary colors (RGBW) would also be conceivable. Furthermore, the subtractive primary colors cyan, magenta and yellow in analogous combinations are also possible (CMW, CYW, MYW or CMYW). A missing primary color can be reconstructed from white. Brightness and/or color matching is advantageous to achieve a more color-true image.

The line scan camera with a monochannel and a color channel explained so far is a preferred embodiment. However, the invention is not limited to this embodiment. The image sensor 18 can also have another shape, in particular with a matrix arrangement of pixels in a matrix camera. Instead of a monochannel and one or more color channels, it is possible that any two recording channels are provided that differ in their sensitivity, so that image data with different signal-to-noise ratios are generated. The same object area is recorded by both recording channels and thus recorded twice. The recording area of the two recording channels should at least overlap, if not be the same, and the noise suppression that now follows refers to the overlapping area. In the non-overlapping areas, no noise suppression or a different noise suppression can be used, in particular by setting values of a filter kernel for pixels from non-overlapping areas to fixed default values. The noise suppression is preferably implemented in an FPGA of the control and evaluation unit 24.

FIG. 7 shows an example image of image data from the monochannel. As explained with reference to FIGS. 1 to 6, there are two images from the two recording channels: an image acquired with higher sensitivity of the first recording channel as shown, and an image of the same object area acquired with lower sensitivity of the second recording channel that is not shown. The image of the first recording channel preferably is a black and white image and the image of the second recording channel preferably is a color image, which in turn may be composed of a plurality of images in, for example, primary colors, and thus the two images are addressed below without limitation of generality.

The noise suppression is to act on the color image to improve its signal-to-noise ratio. However, the corresponding noise suppression filter is generated or parameterized based on the black and white image. For this purpose, one pixel 44 is considered at a time, which is located in the center of a neighborhood 46. A decentered pixel is also conceivable. This is not discussed separately, since it could be achieved by zeros at the edge of a centered noise suppression filter. In the same way, an effective deviation from a rectangular shape of the neighborhood 46 can be achieved, so that a rectangular shape is assumed without limitation. During noise suppression, each pixel is once the considered pixel 44, with the considered pixel 44 changed for example in an iterative fashion, or at least this is true for all pixels in an image section of interest.

FIG. 8 shows the neighborhood 46 around the considered pixel 44 on a formalized pixel grid. A filter kernel is to be found for the considered pixel 44 according to the neighborhood 46. The considered pixel 44 is located at position (i,j). The neighborhood 46 is assumed to be a region with n×n pixels, here purely by way of example n=5. This results in the shown neighborhood 46 with the positions (i−2:i+2, j−2:j+2). It has already been explained that any deviations from a centered matrix are possible and in particular easy to implement by zeros in the filter kernel. The filter kernel is local: if during continued processing the considered pixel 44 changes, in particular in an iteration over i and j, the filter kernel also changes. Iteration may incidentally imply sequential processing, but parallelization with simultaneous processing of multiple considered pixels 44 is also possible.

The gray value G(i,j) of the considered pixel 44 is known. It is now looked for pixels in the neighborhood 46 that are similar to the considered pixel 44. For this purpose, a symmetrical threshold e is determined. For each pixel in the neighborhood 46 at the positions (i−2:i+2, j−2:j+2), it is checked whether its gray value G matches the tolerance given by the threshold e. The gray value of the pixel in the neighborhood 46 is determined by the following parameters $G(i,j)-e \leq G \leq G(i,j)+e$. If this similarity criterion is satisfied, the corresponding entry in the filter kernel is set to one, otherwise to zero.

FIG. 9 shows again the example image of FIG. 7, where now the similar part 48 of the neighborhood 46 is highlighted where the pixels fulfill the similarity criterion and consequently the entries of the filter kernel are set to one. Due to the similarity in the gray value, there is a high chance that this is a common object structure.

FIG. 10 shows the neighborhood 46 around the considered pixel 44 and the similar part 48 of FIG. 9 on the formalized pixel grid shown in FIG. 8, with the pixels of the similar part 48 shown in black and the remaining non-similar pixels shown in white. In the filter kernel, the pixels of the similar portion 48 are initially assigned a value of one and the remaining non-similar pixels are assigned a value of zero. In an advantageous normalization step, the number m of pixels of the similar part 48 is counted, where simply a sum can be calculated over the filter kernel. The ones of the filter kernel are then replaced by the reciprocal 1/m of the number m. In this normalized form, the filter kernel can be applied directly to the color image. Otherwise, the number m should be taken into account when filtering.

The filter kernel is generated from the black and white image, but is now applied to the color image. For this purpose, for a respective considered pixel (i,j) of the color image, each pixel in a neighborhood of the color image is multiplied point by point with the corresponding entry of the filter kernel, and the sum of these contributions is assigned to the considered pixel (i,j). Consequently, it is kind of an averaging over a neighborhood of the color image, which is similar to the conventional convolution with a smoothing or averaging kernel. However, there is a crucial difference: the filter kernel is not globally defined, but locally conditioned per considered pixel (i,j) by a similarity of the black and white image at the same position. Only that part of the neighborhood of the color image is included where there is sufficient similarity to the considered pixel 44 in the black and white image. The original value of the pixel (i,j) is either included in the number m and weighted equally, or this value is specifically weighted higher or lower, or not at all.

Convolution with a filter kernel is a particularly simple implementation, but the invention is not limited to any particular way in which the similarity in the black and white image conditions the influence of the neighborhood of the color image in noise suppression. Further, it is simple and yields good results to use a digital similarity criterion whether a pixel from the neighborhood contributes or does not contribute. Alternatively, however, quantifying weights are also conceivable, which depend in particular on the degree of similarity or dissimilarity, in particular by means of a weighting function depending on the gray value difference $|G-G(i,j)|$ of the respective pixel of the neighborhood 46 with gray value G.

FIGS. 11 and 12 show an example image before and after applying the noise suppression according to the invention. It is a black and white image solely due to representation, and therefore somewhat confusing because these example images are indeed the color images from the second recording channel. In contrast, the example images of FIGS. 7 and 9 are not black and white images solely due to representation, but actually are black and white images from the first recording channel, used to construct the respective local filter kernel based on the similarity of pixels in the neighborhood 46 of the considered pixel 44.

In FIG. 11, noise-induced interspersed dark spots and blurred edges can be seen. After noise suppression according to the invention, it is clearly visible in FIG. 12 that these noise effects are considerably reduced without spatial resolution being lost.

The invention claimed is:

1. A camera comprising
an image sensor having a first recording channel of a first sensitivity for recording first image data including first pixels and a second recording channel of a second sensitivity lower than the first sensitivity for recording second image data including second pixels, wherein first pixels and second pixels are associated with one another by capturing a same object area,
and a control and evaluation unit for processing the image data, configured to suppress noise effects in the second image data using a noise suppression filter that assigns a new value to a respective considered second pixel based on second pixels in a neighborhood of the considered second pixel,
wherein the noise suppression filter takes the second pixels in the neighborhood into account with a weighting that depends on how similar first pixels associated with the second pixels are to the associated first pixel of the respective considered second pixel.

2. The camera according to claim 1,
wherein the camera is configured as a code reader for reading an optical code.

3. The camera according to claim 1,
wherein the control and evaluation unit is configured to take into account, for the noise suppression filter, only second pixels in the neighborhood whose associated first pixel fulfills a similarity criterion to the first pixel associated with the respective considered second pixel.

4. The camera according to claim 3,
wherein the similarity criterion comprises at least one threshold for evaluating a difference between a first pixel in the neighborhood and the associated first pixel of the respective considered second pixel.

5. The camera according to claim 1,
wherein the noise suppression filter is an averaging filter.

6. The camera according to claim 1,
wherein the noise suppression filter comprises a filter kernel defining a neighborhood around a respective considered pixel.

7. The camera according to claim 6,
wherein the filter kernel comprises values set according to a similarity of first pixels in a neighborhood to a central first pixel.

8. The camera according to claim 7,
wherein the control and evaluation unit is configured to at least one of allocate zero values to the filter kernel where a similarity criterion is not fulfilled and non-zero values of mutually equal size where a similarity criterion is fulfilled.

9. The camera according to claim 7,
wherein the control and evaluation unit is configured to count a number how often the filter kernel has non-zero values.

10. The camera according to claim 9,
wherein the control and evaluation unit is configured to normalize the filter kernel with the number.

11. The camera according to claim 1,
wherein the control and evaluation unit is configured to adapt the resolution of the first image data and the second image data to one another.

12. The camera according to claim 1,
wherein the first recording channel is configured as a monochannel with sensitivity to white light for recording image data of a gray-scale image.

13. The camera according to claim 1,
wherein the second recording channel is configured as at least one color channel having sensitivity to light of a particular color for recording image data of the color.

14. The camera according to claim 13,
wherein the second recording channel comprises a plurality of color channels of different colors.

15. The camera according to claim 1,
wherein the image sensor is configured as a line sensor having at least two lines of light-receiving elements.

16. The camera according to claim 15,
wherein each line is completely assigned to either the first recording channel or the second recording channel.

17. The camera according to claim 1,
that is stationarily mounted above a stream of objects to be recorded.

18. The camera according to claim 1,
wherein the control and evaluation unit is configured to generate a gray-scale image from the first recording channel and a color image from the second recording channel.

19. A method for acquiring first image data including first pixels in a first recording channel of a first sensitivity of an image sensor and for acquiring second image data including second pixels in a second recording channel of a second sensitivity smaller than the first sensitivity of the image sensor, wherein first pixels and second pixels are associated with one another by capturing a same object area, wherein noise effects in the second image data are suppressed using a noise suppression filter that assigns a new value to a respective considered second pixel based on second pixels in a neighborhood of the considered second pixel, wherein the noise suppression filter takes the second pixels in the neighborhood into account with a weighting that depends on how similar first pixels associated with the second pixels are to the associated first pixel of the respective considered second pixel.

* * * * *